United States Patent Office 3,322,549
Patented May 30, 1967

3,322,549
INORGANIC MOLDING COMPOSITIONS OF THE ASBESTOS - ORTHOPHOSPHORIC ACID - TYPE AND PRODUCTS PRODUCED THEREFROM
Visvaldis Abolins and Robert M. Lukes, Erie, Pa., assignors to General Electric Company, a corporation of New York
No Drawing. Filed Nov. 29, 1963, Ser. No. 327,109
3 Claims. (Cl. 106—38.3)

This invention relates generally to asbestos-orthophosphoric acid-type molding compositions and more particularly to molding compositions of such type having an extended working-life at room temperature and to products produced from such compositions.

The U.S. Patent No. 2,366,485 to Brink and Arone teaches an inorganic molding composition comprising a reaction mixture of chrysotile asbestos fibers and orthophosphoric acid of greater than 60% concentration. Although the composition of that patent was capable of being hot molded directly to any desired shape to produce in a very short time a mechanically strong, dense, rigid, stone-like material which was particularly useful for arc chutes and other high temperature applications, it had an extremely short working-life at room temperature. For example, the components of this molding composition reacted so rapidly at room temperature that molding after 15 minutes was usually no longer practicable. In spite of this distinct disadvantage, however, the products produced from this composition exhibited properties which were so especially desirable for arc chutes and other high temperature applications, that the composition of that patent has been extensively used for such purposes right up to the present time.

It is an object of this invention, therefore, to provide an asbestos-orthophosphoric acid-type composition having an extended room temperature working life and which is capable of being hot molded to any desired shape to produce dense, rigid, stone-like materials which are particularly useful for arc chutes and other high temperature applications.

Unexpectedly, we have discovered that an asbestos-orthophosphoric acid-type hot molding composition may be provided which has an extended working life at room temperature by mixing chrysotile asbestos fibers with the reaction product of a reaction mixture of chrysotile asbestos fibers and at least an equal part by weight, and preferably from one to four parts by weight, of orthophosphoric acid having a concentration exceeding 60%. The thermoset materials produced from this composition are dense, rigid and stone-like and have excellent surface properties. They are particularly useful as arc chutes and can be produced as such directly and in intricate shapes by use of the known hot molding technique and without machining of the molded product.

The products are not only produced by a simple hot molding technique but cure relatively fast to thermoset compositions and show but slight shrinkage in the mold. The molded products exhibit excellent surface finish which obviates any further finishing or polishing operations, although the material may be readily machined if desired. Thus, it has been found that the molded products produced from the compositions of this invention exhibit all of the desirable characteristics of the products produced from the composition of the prior Brink and Arone Patent No. 2,366,485. The compositions of this invention, however, have an extended working life at room temperature thereby completely overcoming the disadvantages associated with the prior molding composition.

For example, in the prior composition the reaction between the acid and the asbestos was so highly exothermic that the constituents had to be extensively cooled during mixing. This was usually accomplished by mixing in the presence of Dry Ice or in water-cooled mixing apparatus. For example, in a typical prior art mixture three pounds of Dry Ice were used for every 30 pounds of asbestos in the mixture. In addition, in order to extend the life of the composition, refrigeration was required after mixing.

In accordance with this invention, therefore, a new and improved molding composition has been provided capable of producing products which are dense, rigid and stone-like and which composition has such as extended working life at room temperature that the costly and inconvenient cooling and refrigeration procedures, usually associated with compositions of this type, are eliminated.

In preparing the new and improved molding compositions of this invention we first provide a reaction mixture of chrysotile asbestos fibers and orthophosphoric acid, having a concentration exceeding 60% and preferably in the range of 60 to 85%. The amount of acid, by weight, in this reaction mixture is made equal to, or greater than, the amount of asbestos fibers and preferably is in the range of one to four parts by weight of acid per part by weight of asbestos fibers. This mixture is allowed to react for at least about two hours and preferably for about a day or more, conveniently at room temperature, to provide a reaction product. Although the exact analysis of this reaction product is not definitely known, it may consist of one or more phosphates. A knowledge of the analysis of this reaction product, however, is not necessary to an understanding of the present invention nor to the preparation of molding compositions including such reaction product.

The resulting reaction product is then mixed with chrysotile asbestos fibers to provide the desired molding composition. Preferably, the molding composition comprises from about ¼ to 1½ parts by weight of chrysotile asbestos fibers per part by weight of reaction product.

The reaction products produced from the reaction mixtures wherein the amount of acid substantially exceeds the amount of asbestos fibers are found to be of either a liquid or a paste-like consistency which appears to remain unchanged for long periods of time. For example, reaction products produced from reaction mixtures wherein the acid-asbestos ratios were three-to-one and four-to-one, respectively, were of a paste-like consistency, while the reaction product produced from a reaction mixture having a six-to-one acid-asbestos ratio exhibited the appearance of a liquid. The characteristics of these reaction products appeared unchanged after a month or more. When these reaction products were mixed with chrysotile asbestos fibers, a molding composition was obtained which had a significantly longer working life than the prior art molding compositions of Patent 2,366,485. For example, the composition comprising the reaction products produced from either a three-to-one or four-to-one acid asbestos reaction mixture exhibited room temperature working lives exceeding 8 hours as compared to 15 minutes for the prior composition. For example, compositions according to this invention have been found to be still readily moldable after being kept at room temperature for 24 hours.

Reaction mixtures of one-to-one and two-to-one acid-asbestos ratios are found to produce a hardened reaction product. Accordingly, such reaction products must first be reduced to a finely divided state before mixture with the chrysotile asbestos fibers to form the final molding composition of this invention. The compositions of this invention have been found to be readily moldable after 24 hours at room temperature and for as long as 72 hours and more as well. Although the molding composition made from the reaction product of the one-to-one acid-asbestos ratio reaction mixture appears to have the longest working life at room temperature, it does not exhibit quite as good flow characteristics as the other compositions so that a higher molding pressure should be employed.

It has also been discovered that although the reaction product produced from a two-to-one acid-asbestos reaction mixture does harden, it can be softened for a short time by the application of heat and pressure, after which a final hardening takes place. Since this characteristic is not exhibited by the reaction product of the one-to-one acid-asbestos ratio reaction mixture, this accounts for the better flow characteristics of the molding composition incorporating the reaction product of the two-to-one acid-asbestos ratio reaction mixture.

The following specific examples of the procedure which may be followed in producing compositions and products according to this invention are given by way of illustration only and not limitation:

Example I 30 grams of short fiber chrysotile asbestos were mixed with 90 grams of 85% orthophosphoric acid. This mixture was allowed to react at room temperature for five days and produced a reaction product having a paste-like consistency which appeared unchanged during the five-day period. 100 grams of this paste-like reaction product were then mixed with 125 grams of short fiber chrysotile asbestos to provide a relatively dry molding composition. 10 grams of this dry molding composition were molded at once at 300° F. and 4000 p.s.i. for 30 minutes to produce a sample which appeared dense, rigid and stone-like. This sample is designated hereafter as sample No. 1. The remainder of the molding composition was kept at room temperature for 24 hours after which time a 10 gram sample was molded as before at 300° F. and 4000 p.s.i. for 30 minutes to provide a similar dense, rigid, stone-like product, designated hereafter as sample No. 2.

For purposes of comparison, a test sample was also obtained from a commercial arc chute molded from the composition of the prior Brink and Arone Patent No. 2,366,485, by a commercial molding company. Since hardness is an important property of the product for use in the desired high temperature applications and also is an indication of the chemical reaction between the acid and asbestos, all samples were tested for hardness by taking several readings with an "Ames" hardness tester using a 60 kilogram load. These three samples gave the following Rockwell-H hardness readings:

|  | Sample No. 1 | Sample No. 2 | Commercial arc chute |
|---|---|---|---|
| Minimum | 95 | 99 | 93 |
| Maximum | 111 | 109 | 101 |
| Average | 104 | 103 | 95 |

Thus, the composition of this invention even after being kept at room temperature for 24 hours was still readily moldable and capable of producing a product having properties which were at least comparable to those of the present commercial arc chutes. For example, the composition had a greatly extended working life at room temperature and produced a molded product which was dense, rigid, stone-like and exhibited an excellent surface finish so that no polishing or other finishing operations were required and also exhibited a hardness at least as great as that of the present commercial arc chutes.

Example II 40 grams of short fiber chrysotile asbestos were mixed with 120 grams of 85% orthophosphoric acid. This mixture was allowed to react for 24 hours at room temperature and produced a reaction product which had a paste-like consistency. 100 grams of this paste-like reaction product were then mixed with 125 grams of short fiber chrysotile asbestos and provided a relatively dry molding composition. Samples molded at once and 24 hours after mixing, designated hereafter as sample No. 3 and sample No. 4, respectively, gave the following Rockwell H hardness readings:

|  | Sample No. 3 | Sample No. 4 |
|---|---|---|
| Minimum | 83 | 103 |
| Maximum | 113 | 114 |
| Average | 99 | 109 |

Example III 40 grams of short fiber chrysotile asbestos were mixed with 120 grams of 85% orthophosphoric acid. This mixture was allowed to react at room temperature for 25 days and produced a reaction product which had a paste-like consistency. 160 grams of this paste-like reaction product were mixed with 200 grams of short fiber chrysotile asbestos to provide a relatively dry molding composition. Samples molded as in Examples I and II, at once and 6 hours after mixing respectively, had slightly less desirable properties than the samples in Examples I and II indicating that a reaction time for the acid-asbestos mixture in excess of 24 hours was not beneficial and that an excessive reaction time, for example 25 days, might, in fact, be detrimental.

Example IV 40 grams of short fiber chrysotile asbestos were mixed with 80 grams of 85% orthophosphoric acid. This mixture was allowed to react for five days at room temperature. The reaction product after this time appeared relatively hard and lumpy. 100 grams of this reaction product were mixed with 100 grams of short fiber chrysotile asbestos to provide a dry molding composition. In order to obtain a better mix, the reaction product was first reduced to a finely divided state and then mixed with the asbestos fibers.

10 grams of this dry molding composition were then molded at once at 300° F. and 4000 p.s.i. and produced a smooth surfaced, dense, rigid, stone-like sample, designated hereafter as sample No. 5. The remainder of the mixed composition was kept at room temperature for 26 hours after which time another 10 gram sample was molded at 300° F. and 4000 p.s.i. to provide sample No. 6. These two samples were tested for hardness as in the previous examples and the following Rockwell H readings obtained:

|  | Sample No. 5 | Sample No. 6 |
|---|---|---|
| Minimum | 86 | 85 |
| Maximum | 107 | 113 |
| Average | 100 | 96 |

Again a comparison of the properties of these samples with the properties and hardness of the test sample from the commercial arc chute showed that the composition of this invention had a very long working life at room temperature and produced a molded product which was dense, rigid and stone-like with excellent surface finish and a hardness at least as great as that of the test sample.

In addition, when a lump of the reaction product produced from the above reaction mixture of 40 grams of asbestos and 80 grams of acid was heated to a temperature of 150° C., it exhibited the novel and unexpected property of softening to an easy-to-spread, tacky consistency. After 3 to 5 minutes at this same temperature, however, the product exhibited a final dense, rigid, stone-like appearance.

Example V 40 grams of short fiber chrysotile asbestos were mixed with 40 grams of 85% orthophosphoric acid. This mixture was allowed to react at room temperature for five days. The resulting reaction product appeared rock-hard and did not soften when heated to 150° C., 200° C. or 250° C. The rock-hard reaction product so obtained was then ground to a fine powder and 100 grams of this powder were mixed with 50 grams of short fiber chrysotile asbestos to provide a very dry molding composition.

30 grams of this very dry molding composition were molded immediately after mixing at 300° F. and 4000 p.s.i. and provided a smooth surfaced, dense, rigid, stone-like product designated hereafter as sample No. 7. Sample No. 8 was obtained in a similar manner by molding a sample after the composition had been kept at room temperature for 24 hours. The following Rockwell H hardness readings were obtained:

|  | Sample No. 7 | Sample No. 8 |
| --- | --- | --- |
| Minimum | 91 | 95 |
| Maximum | 117 | 113 |
| Average | 106 | 109 |

Even better properties were obtained using the above molding composition and a molding pressure of 6000 p.s.i. instead of 4000 p.s.i. Also, improved properties were obtained at both the 4000 p.s.i. and 6000 p.s.i. pressures by employing a molding composition which comprised 100 grams of the powdered reaction product and 30 grams of the short fiber chrysotile asbestos. Also, it appeared that this molding composition could be kept at room temperature for several days or longer without exhibiting any effect whatsoever on its moldability or the characteristics of the product produced therefrom.

Accordingly, the foregoing has shown that there has been provided a hot molding composition of the asbestos-orthophosphoric acid-type having a long working life at room temperature. Also, the product produced from this composition is at least as good as that produced from the prior molding compositions of this type which were subject to very short working lives at room temperature. Moreover, the molding compositions prepared from the solid, hard reaction product resulting from a reaction mixture of equal parts of acid and asbestos have the longest working life but exhibit slightly less desirable flow properties than the compositions incorporating the reaction product of the 3 to 1 or 4 to 1 acid-asbestos reaction mixtures. In addition, although the reaction mixture may be allowed to react for a relatively long period of time, the products are found to have slightly less desirable properties when the reaction is allowed to continue for as long as 25 days. Preferably, the reaction should be allowed to continue for about 24 hours although reaction for as little as 2 or 3 hours has proved sufficient to provide a molding composition with a working life of at least 24 hours.

It will be understood that our invention is not limited to the specific examples or embodiments described, and that various changes, modifications and deviations may be made therefrom without departing from the spirit and scope of the appended claims.

What we claim as new and desire to secure by Letters Patent of the United States is:

1. The method of making a hot molding thermosetting molding composition having an extended working life at room temperature which comprises the steps of:
   (a) mixing one part by weight of chrysotile asbestos fibers with from one to four parts by weight of orthophosphoric acid having a concentration exceeding 60%;
   (b) reacting said mixture of asbestos fibers and orthophosphoric acid at room temperature for at least two hours to provide a reaction product;
   (c) mixing chrysotile asbestos fibers with the reaction product so produced in the proportion of ¼ to 1½ parts by weight of chrysotile asbestos fibers per part by weight of said reaction product.

2. The method of claim 1 wherein the reaction product is produced from a mixture of one part by weight chrysotile asbestos fibers and from 2 to 4 parts by weight orthophosphoric acid having a concentration exceeding 60% and wherein said mixture is reacted at room temperature for at least two hours and not more than 25 days.

3. The method of making an inorganic thermoset molded product which comprises hot molding the composition prepared in accordance with the method of claim 1 at a pressure in the range of about 4000 to 6000 p.s.i.

References Cited

UNITED STATES PATENTS

| 2,366,485 | 1/1945 | Brink et al. | 106—286 |
| 2,592,521 | 4/1952 | Thompson | 106—286 |
| 2,687,967 | 8/1954 | Yedlick et al. | 106—286 XR |
| 2,795,510 | 6/1957 | Thompson | 106—286 |

ALEXANDER H. BRODMERKEL, *Primary Examiner.*

SAMUEL H. BLECH, *Examiner.*

J. B. EVANS, *Assistant Examiner.*